(12) United States Patent
Yoshihiro

(10) Patent No.: US 10,766,225 B2
(45) Date of Patent: Sep. 8, 2020

(54) LAMINATE, BUILDING MATERIAL, WINDOW MATERIAL, AND RADIATION COOLING DEVICE

(71) Applicant: FUJIFILM CORPORATION, Minato-ku, Tokyo (JP)

(72) Inventor: Tatsuya Yoshihiro, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/583,293

(22) Filed: Sep. 26, 2019

(65) Prior Publication Data

US 2020/0016864 A1 Jan. 16, 2020

Related U.S. Application Data

(63) Continuation of application No. PCT/JP2018/007238, filed on Feb. 27, 2018.

(30) Foreign Application Priority Data

Mar. 30, 2017 (JP) .................................. 2017-069169

(51) Int. Cl.
*B32B 15/04* (2006.01)
*B32B 17/06* (2006.01)
(Continued)

(52) U.S. Cl.
CPC .............. *B32B 7/023* (2019.01); *B32B 15/01* (2013.01); *E06B 3/307* (2013.01);
(Continued)

(58) Field of Classification Search
USPC .......................... 428/428, 432, 688, 701, 702
See application file for complete search history.

(56) References Cited

U.S. PATENT DOCUMENTS 4,770,496 A * 9/1988 Mahlein ................. G02B 5/285
359/588
5,814,367 A * 9/1998 Hubbard ................ G02B 5/282
427/162
(Continued)

FOREIGN PATENT DOCUMENTS

JP H10-182192 A 7/1998
JP 2005-144985 A 6/2005
(Continued)

OTHER PUBLICATIONS

International Search Report issued in International Application No. PCT/JP2018/007238 dated May 29, 2018.
(Continued)

*Primary Examiner* — Lauren R Colgan
(74) *Attorney, Agent, or Firm* — Solaris Intellectual Property Group, PLLC

(57) ABSTRACT

Provided are a laminate including a substrate; and a laminated structure including two or more kinds of layers having different specific acoustic impedances which is disposed on the substrate, in which the number of the layers constituting the laminated structure is 10 or more, a thickness of a layer having the largest thickness among the layers constituting the laminated structure is 8 nm or less, and in the laminated structure, a CV value defined by a standard deviation of a layer thickness/average layer thickness is 0.05 or more, and a building material, a window material, and a radiation cooling device including the laminate.

13 Claims, 3 Drawing Sheets

(51) Int. Cl.
  *B32B 7/023* (2019.01)
  *B32B 15/01* (2006.01)
  *E06B 3/30* (2006.01)
(52) U.S. Cl.
  CPC ....... *B32B 2250/05* (2013.01); *B32B 2307/40* (2013.01); *B32B 2311/24* (2013.01)

(56) References Cited

U.S. PATENT DOCUMENTS

| | | | |
|---|---|---|---|
| 9,594,195 B2* | 3/2017 | Vikor | G02B 27/142 |
| 10,408,981 B2* | 9/2019 | Yoshihara | G03B 11/00 |
| 2003/0142407 A1* | 7/2003 | Kitagawa | G02B 5/285 |
| | | | 359/586 |
| 2004/0080830 A1* | 4/2004 | Leu | C23C 14/083 |
| | | | 359/558 |
| 2004/0150883 A1* | 8/2004 | Shimoda | G03B 21/60 |
| | | | 359/443 |
| 2006/0007548 A1* | 1/2006 | Watanabe | G02B 21/16 |
| | | | 359/589 |
| 2007/0183069 A1* | 8/2007 | Abe | G02B 5/205 |
| | | | 359/888 |
| 2008/0199671 A1* | 8/2008 | Miyagi | C03C 17/3417 |
| | | | 428/216 |
| 2009/0237782 A1 | 9/2009 | Takamatsu et al. | |
| 2011/0164308 A1* | 7/2011 | Arsenault | G02F 1/0147 |
| | | | 359/322 |
| 2012/0105965 A1* | 5/2012 | Koyama | G02B 5/282 |
| | | | 359/588 |
| 2014/0131023 A1 | 5/2014 | Raman et al. | |
| 2015/0226962 A1* | 8/2015 | Kashdan | G02B 5/288 |
| | | | 427/9 |
| 2015/0260889 A1* | 9/2015 | Shiono | G02B 5/208 |
| | | | 252/587 |
| 2015/0338175 A1* | 11/2015 | Raman | B60H 1/32 |
| | | | 165/185 |
| 2015/0346403 A1* | 12/2015 | Jidai | B32B 7/02 |
| | | | 348/164 |

FOREIGN PATENT DOCUMENTS

| | | |
|---|---|---|
| JP | 2006-334787 A | 12/2006 |
| JP | 2013-531712 A | 8/2013 |
| JP | 2013-256104 A | 12/2013 |
| WO | 2007/049478 A1 | 5/2007 |
| WO | 2017/047281 A1 | 3/2017 |

OTHER PUBLICATIONS

Written Opinion of the ISA issued in International Application No. PCT/JP2018/007238 dated May 29, 2018.

* cited by examiner

LAMINATE, BUILDING MATERIAL, WINDOW MATERIAL, AND RADIATION COOLING DEVICE

CROSS-REFERENCE TO RELATED APPLICATIONS

This application is a continuation application of International Application No. PCT/JP2018/007238, filed Feb. 27, 2018, the entire disclosure of which is incorporated herein by reference. Further, this application claims priority from Japanese Patent Application No. 2017-069169, filed Mar. 30, 2017, the entire disclosure of which is incorporated herein by reference.

BACKGROUND OF THE INVENTION

1. Field of the Invention

The present disclosure relates to a laminate, a building material, a window material, and a radiation cooling device.

2. Description of the Related Art

Currently, in view of energy saving, the thermal insulation function is more required for building materials, window materials and the like. For example, in a house, window glass can be considered as a particularly large heat source and outlet.

As a heat insulating material having a high heat insulating function, a vacuum heat insulating material (0.002 W/(m·K)), glass wool (0.03 W/(m·K)), and the like are known. However, the vacuum heat insulating material and the glass wool are both optically opaque materials, and thus can be hardly used as window materials.

As a window material, vacuum glass of a structure including two window glasses arranged at a distance from each other and having a space sandwiched between the two window glasses to be evacuated is used.

However, vacuum glass has a problem in that the weight is increased by forming two window glasses, and there is a problem in that the cost is high because a structure for maintaining a vacuum is required.

Under the above background, various laminates having optical properties or heat insulation properties are researched.

For example, in JP2006-334787A, as a transparent heat insulating laminate having high visible light transmittance and high infrared light blocking properties, disclosed is a transparent heat insulating optical laminate obtained by laminating a plurality of metal layers that reflect heat rays and a plurality of transparent light compensation layers on a transparent substrate, so as to transmit visible light and reflect heat rays, in which the light compensation layer is a transparent conductive layer formed of conductive metal oxide, a light transmittance T (510) at a wavelength of 510 nm is 74% or more, and a ratio T (900)/T (700) of a light transmittance T (700) at a wavelength of 700 nm to a light transmittance T (900) at a wavelength of 900 nm is 0.3 or less.

In JP2013-256104A, as a heat reflecting structure having excellent heat ray reflectivity, visible light transmittance, and radio wave transmittance, disclosed is a heat reflecting structure having a substrate, and an alternating laminate which is located on a substrate, in which metal layers and dielectric layers are alternately laminated, and of which both outermost layers are dielectric layers, in which the dielectric layer includes a crystalline region and an amorphous region of metal oxide.

In JP1998-182192A (JP-H10-182192A), as a heat insulating glass having greatly improved moisture resistance, disclosed is a heat insulating glass in which at least a transparent oxide film layer, a noble metal film layer, and an Al—Zn film layer are combined and sequentially laminated on the surface of a glass substrate, and an Al—Zn film layer is present so as to protect the noble metal film layer at least with an Al—Zn film layer.

SUMMARY

However, compared with the techniques described in JP2006-334787A, JP2013-256104A, and JP1998-182192A (JP-H10-182192A), it is required to further reduce the thermal conductivity and further improve the thermal insulation function.

Accordingly, an object of the present disclosure is to provide a laminate having reduced thermal conductivity, and a building material, a window material, and a radiation cooling device including the laminate.

Means for solving the above problems include the following aspects.

<1> A laminate comprising: a substrate; and
   a laminated structure including two or more kinds of layers having different specific acoustic impedances which is disposed on the substrate,
   in which the number of layers constituting the laminated structure is 10 or more,
   a thickness of a layer having the largest thickness among the layers constituting the laminated structure is 8 nm or less, and
   in the laminated structure, a CV value defined by a standard deviation of layer thicknesses/average layer thickness is 0.05 or more.

<2> The laminate according to <1>, in which the number of the layers constituting the laminated structure is 100 or more.

<3> The laminate according to <1> or <2>, in which the laminated structure is two or more kinds of metal compounds selected from the group consisting of metal oxide, metal nitride, metal oxynitride, and metal sulfide.

<4> The laminate according to <3>, in which a metal element in the two or more kinds of metal compounds is at least one element selected from the group consisting of Si, Al, Nb, Mg, Zr, Ge, and Zn.

<5> The laminate according to any one of <1> to <4>, in which the two or more kinds of layers having different specific acoustic impedances include two or more kinds of metal oxide layers or two or more kinds of metal nitride layers.

<6> The laminate according to any one of <1> to <5>, in which the two or more kinds of layers having different specific acoustic impedances include a combination of $Al_2O_3$ layers and $SiO_2$ layers, a combination of $Nb_2O_5$ layers and $SiO_2$ layers, and a combination of AlN layers and SiN layers.

<7> The laminate according to any one of <1> to <6>, further comprising: a light interference layer having a layer thickness of more than 8 nm.

<8> The laminate according to any one of <1> to <7>, in which the minimum transmittance in a wavelength range of 400 nm to 800 nm is 10% or more.

<9> The laminate according to any one of <1> to <7>, in which the minimum transmittance in a wavelength range of 6 µm to 12 µm is 10% or more.

<10> A building material comprising: the laminate according to any one of <1> to <9>.

<11> A window material comprising: the laminate according to <8> or <9>.

<12> A radiation cooling device comprising: the laminate according to <9>.

According to the present disclosure, it is possible to provide a laminate having reduced thermal conductivity, and a building material, a window material, and a radiation cooling device comprising the laminate.

DETAILED DESCRIPTION

Figure 1:
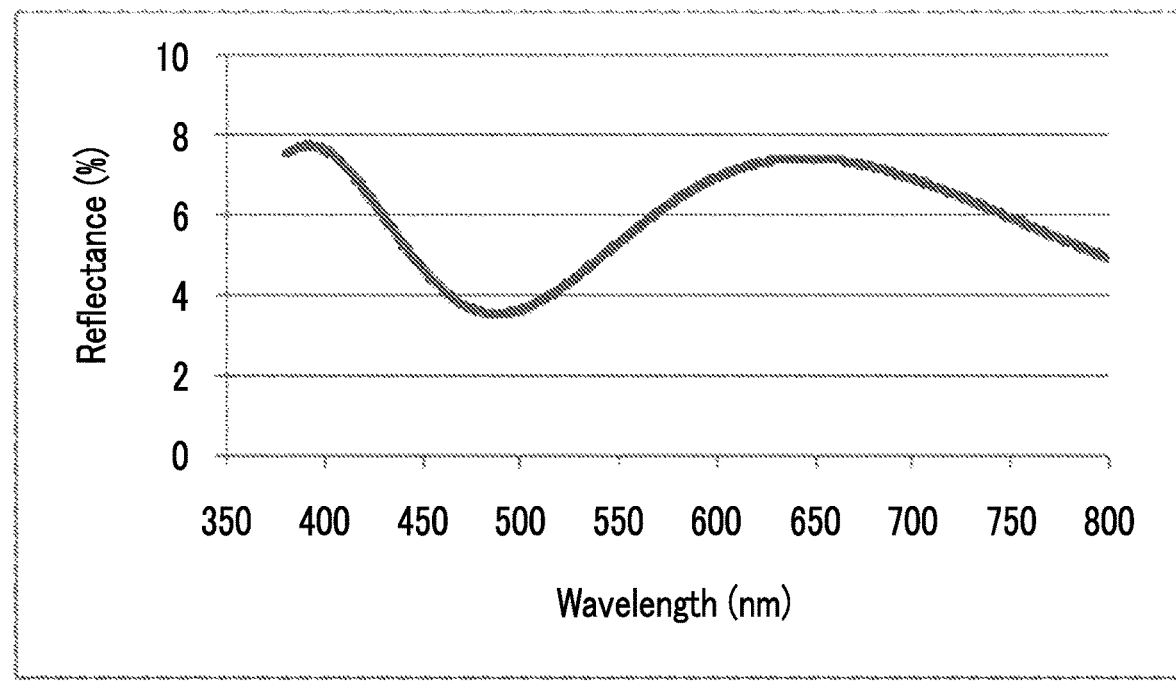
FIG. 1 is a reflection spectrum of a laminate of Example 2 in a wavelength range of 400 nm to 800 nm.

According to the present specification, the numerical range expressed by using "to" means a range including numerical values described before and after "to" as a lower limit value and an upper limit value.

The expression "metal" used in the present specification also includes semimetal (for example, Si and Ge).

The expression "light" used in the present specification refers to electromagnetic waves in general, and is not limited to visible light.

The expression "layer thickness" used in the present specification refers to the thickness of one layer.

[Laminate]

The laminate of the present disclosure includes a substrate and a laminated structure having two or more layers that are disposed on the substrate having different specific acoustic impedances, in which the number of layers constituting the laminated structure is 10 or more, a thickness of a layer having the largest thickness among the layers constituting the laminated structure is 8 nm or less, and in the laminated structure, a CV value defined by the standard deviation of the layer thickness/average layer thickness is 0.05 or more.

The laminate of the present disclosure may include an element (for example, light interference layers described below) in addition to the substrate and the layered structure.

The laminate of the present disclosure is a laminate with reduced thermal conductivity. Therefore, the laminate of the present disclosure has an excellent thermal insulation function.

The main reasons of the effect are presumed as follows, but the laminate of the present disclosure is not limited by the following reasons.

The laminate of the present disclosure includes a laminated structure including two or more kinds of layers having different specific acoustic impedances, and the number of layers constituting the laminated structure is 10 or more.

An interface thermal resistance is present on the interface between two kinds of different materials.

With respect to the laminate of the present disclosure, the number of layers constituting the laminated structure is 10 or more, the number of interfaces having the interface thermal resistance is 9 or more, and thus it is considered that the thermal conductivity is reduced.

In the laminate of the present disclosure, a thickness of a layer having the largest thickness among the layers constituting the laminated structure including two or more kinds of layers having different specific acoustic impedances is 8 nm or less.

Here, the thickness of a layer having the largest thickness among the layers constituting the laminated structure means the maximum value in the population including the thickness of each of all the layers constituting the laminated structure.

The specific acoustic impedance is a product of the density of a substance and the speed of sound. In the laminated structure including or 2 more kinds of layers having different specific acoustic impedances, the interface reflection of phonons is generated.

It is thought that in the laminate of the present disclosure, in a case where the laminated structure including 2 or more kinds of layers having different specific acoustic impedances satisfies both of a case where the interface reflection of phonons is generated, and a case where the layer thickness (8 nm or less as the maximum layer thickness) of the layers constituting the laminated structure is smaller than several tens of mm which is regarded as the mean free path of phonons, interference of phonons is generated.

According to the interference of the phonons, thermal conductivity in the laminated structure is effectively reduced.

In the laminated structure in the present disclosure, the CV value defined by the standard deviation of the layer thickness/the average layer thickness is 0.05 or more.

Here, the average layer thickness means an arithmetic average value of a population including the thicknesses of each of all the layers constituting the laminated structure.

The standard deviation of the layer thickness means the standard deviation of a population including the thickness of each of all the layers constituting the laminated structure.

The fact that the CV value of the laminated structure is 0.05 or more means, roughly speaking, that a certain degree of unevenness (specifically, unevenness between layers) is present in the layer thicknesses of the layers constituting the laminated structure.

In a case where the CV value of the laminated structure is 0.05 or more, the thermal conductivity is reduced effectively. It is considered that the reason is that the phonon's Anderson localization occurs due to the presence of a certain degree of unevenness in the layer thicknesses of the layers constituting the laminated structure and the interference of phonons as described above, such that the average transmittance of the phonons decreases and as a result, the thermal conductivity in the laminated structure is effectively reduced.

In the laminate of the present disclosure, from the reasons above, it is considered that the thermal conductivity is effectively reduced.

Subsequently, each element of the laminate of the present disclosure is described.

<Substrate>

The substrate is not particularly limited, and any substrate can be used.

Examples of the material of the substrate include glass, metal, a metal compound, plastic, and ceramic.

Examples of the glass include natural quartz glass, synthetic quartz glass, soda glass, and lanthanum glass.

Examples of the metal include Si and Ge.

Examples of the metal compound include ZnSe, ZnS, a mixture of TlBr and TlI, and a mixture of TlBr and TlCl.

The shape of the substrate is not particularly limited, but a plate shape is preferable in that it can be applied to various applications.

<Laminated Structure>

The laminate of the present disclosure includes a laminated structure including two or more kinds of layers having different specific acoustic impedances which is disposed on a substrate.

(Material)

The layers constituting the laminated structure is preferably a layer including each of the two or more different kinds of specific acoustic impedances.

The two or more different kinds of materials constituting the laminated structure may be two or more kinds of organic materials having different specific acoustic impedances, may be two or more kinds of inorganic materials, or may be a combination of one or more kinds of organic materials and one or more kinds of inorganic materials.

With respect to the specific value (unit: $N \cdot s/m^3$) of the intrinsic acoustic impedance of a substance, Mechanical Acoustics (Kimihiko Yasuda, 2004, Corona Publishing Co., Ltd.) can be referred to.

The laminated structure preferably includes two or more kinds of layers constituting the laminated structure in which a ratio to the minimum specific acoustic impedance is different by 1.1 or more (more preferably 1.5 or more).

In view of the ease of film formation, the laminated structure preferably includes two or more metal compounds selected from the group consisting of metal oxides, metal nitrides, metal oxynitrides, and metal sulfides.

It is preferable that the layers constituting the laminated structure are preferably two or more kinds of layers including the respective two or more kinds of metal compounds.

Examples of the specific aspects of the laminated structure include an aspect of including two or more kinds of layers (hereinafter, also referred to as a "metal oxide layer") including metal oxide, an aspect of including two or more kinds of layers (hereinafter, also referred to as a "metal nitride layer") including metal nitride, an aspect of including two or more kinds of layers (hereinafter, also referred to as a "metal oxynitride layer") including metal oxynitride, an aspect of including two or more kinds of layers (hereinafter, also referred to as a "metal sulfide layer") including metal sulfide, an aspect of including one or more kinds of metal oxide layers and one or more kinds of metal nitride layers, an aspect of including one or more kinds of metal oxide layers and one or more kinds of metal oxynitride layers, an aspect of including one or more kinds of metal oxide layer and one or more kinds of metal sulfide layers, an aspect of including one or more kinds of metal nitride layers and one or more kinds of metal oxynitride layers, an aspect of including one or more kinds of metal nitride layers and one or more kinds of metal sulfide layers, and an aspect of including one or more kinds of metal oxynitride layers and one or more kinds of metal sulfide layers.

A preferable aspect of the laminated structure is a structure in which the first layers (hereinafter, also referred to as "X layers") and the second layers (hereinafter, also referred to as "Y layers") are alternately disposed like the X layer/the Y layer/the X layer/the Y layer/the X layer, and the like, or a structure in which at least one kind of the other layers other than the X layer and the Y layer is inserted between any layers in the alternately disposed structure.

Examples of the structure in which at least one kind of the other layers is inserted between any layers include the structure of the X layer/the Y layer/a Z layer/the X layer/the Y layer/a W layer/the X layer, and the like. Here, the Z layer is a third layer, and the W layer is a fourth layer.

The metal element in the metal compound is preferably at least one kind (more preferably two or more kinds) of elements selected from the group consisting of Si, Al, Nb, Mg, Zr, Ge, and Zn.

The metal element in the metal compound preferably includes at least one kind (more preferably two or more kinds) selected from the group consisting of Si, Al, and Nb, more preferably includes at least one kind selected from the group consisting of Si and Al, and particularly preferably includes Si.

Examples of the metal oxide include $Al_2O_3$, $SiO_2$, $Nb_2O_5$, MgO, and $GeO_2$, ZnO, $ZrO_2$.

Examples of the metal nitride include AlN and SiN.

Examples of the metal oxynitride include AlON and SiON.

Examples of the metal sulfide include ZnS.

In view of more effectively obtaining the effect of reducing the thermal conductivity, the two or more kinds of layers having different specific acoustic impedances preferably include two or more kinds of metal oxide layers or two or more kinds of metal nitride layers, and particularly preferably a combination of $Al_2O_3$ layers and $SiO_2$ layers, a combination of $Nb_2O_5$ layers and $SiO_2$ layers, or a combination of AlN layers and SiN layers.

(The Number of Layers)

The number of layers constituting the laminated structure is 10 or more as described above.

In view of reducing the thermal conductivity of the laminate, the number of layers constituting the laminated structure is preferably 20 or more, more preferably 50 or more, and even more preferably 100 or more.

The upper limit of the number of layers constituting the laminated structure is not particularly limited. In view of manufacturing suitability of the laminate, for example, the upper limit of the number of layers constituting the laminated structure is 10,000,000, preferably 3,000,000, and particularly preferably 1,000,000.

(Maximum Layer Thickness, Average Layer Thickness)

The thickness of a layer having the largest thickness among the layers constituting the laminated structure is 8 nm or less. Accordingly, as described above, the thermal conductivity of the laminate is reduced.

In view of reducing the thermal conductivity of the laminate, the thickness of a layer having the largest thickness among layers constituting the laminated structure is preferably 5 nm or less and more preferably 4 nm or less.

The lower limit of the thickness of a layer having the largest thickness among the layers constituting the laminated structure is not particularly limited. In view of the suitability of the layer formation (film formation), the lower limit of the thickness of a layer having the largest thickness among the layers constituting the laminated structure is preferably 1 nm and more preferably 2 nm.

The upper limit of the average layer thickness of the layers constituting the laminated structure is preferably 7 nm, more preferably 4 nm, and particularly preferably 3 nm.

The lower limit of the average layer thickness of the layers constituting the laminated structure is preferably 1 nm and more preferably 2 nm.

(CV Value)

With respect to the laminated structure, a CV value defined by the standard deviation of the layer thickness/average layer thickness is 0.05 or more.

In view of further reducing the thermal conductivity, the CV value of the layer thickness of the layers constituting the laminated structure is preferably 0.10 or more.

The upper limit of the CV value of the layer thickness of the layers constituting the laminated structure is not particularly limited, and the upper limit is, for example, 0.60.

<Light Interference Layer>

The laminate of the present disclosure preferably includes at least one layer of light interference layers having a layer thickness of more than 8 nm. Accordingly, the optical function of the laminate can be further improved.

As described above, the layer thickness (8 nm or less even in the maximum layer thickness) of each layer constituting the laminated structure is significantly smaller than the wavelength of visible light (400 nm to 800 nm). For this reason, the visible light cannot distinguish, for example, between the X layer and the Y layer in the laminated structure. Therefore, in a case of being viewed with the visible light, the laminated structure is regarded as a single layer mixed material film having an average refractive index. The same can be said in view of electromagnetic waves having a longer wavelength than visible light.

Therefore, seen from the laminated structure, the optical function of the laminate can be further improved by disposing the light interference layer the substrate side and/or on the opposite side to the substrate. For example, it is possible to cause the laminated structure to have an antireflection effect in a specific wavelength and have a reflection increasing effect in a specific wavelength.

The layer thickness of the light interference layer is not particularly limited, as long as the layer thickness is more than 8 nm, and the layer thickness is preferably 8.3 nm or more, more preferably 9 nm or more, and particularly preferably 10 nm or more.

In view of the manufacturing suitability of the light interference layer, the upper limit of the layer thickness of the light interference layer is preferably 1,000 nm, more preferably 200 nm, and particularly preferably 100 nm.

The material of the light interference layer is preferably at least one metal compound selected from the group consisting of metal oxide, metal nitride, metal oxynitride, and metal fluoride, Si (single substance), or Ge (single substance).

The metal element in the metal compound as the material of the light interference layer is preferably at least one element selected from the group consisting of Si, Al, Nb, Mg, Zr, La, Ti, Y, Ca, Ba, Li, and Na.

In the laminate of the present disclosure, examples of the wavelength range of interest include a wavelength range (that is, visible region) of 400 nm to 800 nm and a wavelength range of 6 μm to 12 μm (that is, a portion of infrared region).

<Form A>

Examples of the preferable form of the laminate of the present disclosure include a form A in which a minimum transmittance of the laminate in the wavelength range of 400 nm to 800 nm is 10% or more.

The laminate according to the form A has an excellent thermal insulation function due to the reduced thermal conductivity, and has a function of transmitting visible light in a wavelength of 400 nm to 800 nm.

The laminate of the form A is suitable as a portion or all of a window material (for example, a window material for construction, a window material for vehicles, a window material for aircraft, and a window material for ships).

The form A is easily achieved, in a case where
  a material of the substrate is glass,
  a material of the laminated structure is two or more kinds
    of metal compounds selected from the group consisting
    of metal oxide, metal nitride, metal oxynitride, and
    metal sulfide, and
  the metal element of the metal compound is one or more
    (more preferably, two or more) selected from the group
    consisting of Si, Al, Nb, Mg, Zr, and Zn.

(Minimum Transmittance)

The minimum transmittance of the laminate according to the form A in a wavelength range of 400 nm to 800 nm is 10% or more.

In the present specification, the minimum transmittance in a wavelength range of 400 nm to 800 nm means a minimum value of the transmittance in a wavelength range of 400 nm to 800 nm.

The minimum transmittance in a wavelength range of 400 nm to 800 nm preferably 30% or more, more preferably 50% or more, and particularly preferably 80% or more.

The upper limit of the minimum transmittance in a wavelength range of 400 nm to 800 nm is not particularly limited, but in view of the manufacturing suitability of the laminate, the preferable upper limit is 99%.

(Maximum Reflectance)

In view of the antireflection function, with respect to the laminate according to the form A, a maximum reflectance in the wavelength range of 400 nm to 800 nm is preferably 10% or less, more preferably 6% or less, even more preferably 5% or less, and still even more preferably 4% or less.

In the present specification, the maximum reflectance in a wavelength range of 400 nm to 800 nm means the maximum value of the reflectance in a wavelength range of 400 nm to 800 nm.

The maximum reflectance in a wavelength range of 400 nm to 800 nm may be 0% and may be more than 0%.

The reduction of the maximum reflectance in a wavelength range of 400 nm to 800 nm is more easily achieved, in a case where the laminate according to the form A includes the light interference layer.

The material of the light interference layer including the laminate according to the form A is preferably at least one metal compound selected from the group consisting of metal oxide, metal nitride, metal oxynitride, and metal fluoride. The metal element in the metal compound is preferably at least one element selected from the group consisting of Si, Al, Nb, Mg, Zr, La, Ti, Y, Ca, Ba, Li, and Na.

<Form B>

Examples of the preferred form of the laminate of the present disclosure include a form B in which the minimum transmittance of the laminate in the wavelength range of 6 μm to 12 μm is 10% or more.

The laminate according to the form B has an excellent heat insulating function due to the reduced thermal conductivity, and has a function of transmitting infrared light in a wavelength of 6 μm to 12 μm.

The laminate of the form A is suitable as a portion or all of a window material having a radiation cooling function (for example, a window material for a radiation cooling device).

The form B is easily achieved, in a case where the material of the substrate is Si, Ge, ZnSe, ZnS, a mixture of TlBr and TlI, or a mixture of TlBr and TlCl, a material of the laminated structure is two or more kinds of metal compounds selected from the group consisting of metal oxide, metal nitride, metal oxynitride, and metal sulfide, and the metal element of the metal compound is one or more (more preferably, two or more) selected from the group consisting of Si, Al, Nb, Mg, Zr, and Zn.

(Minimum Transmittance)

The minimum transmittance of the laminate according to the form B in a wavelength range of 6 μm to 12 μm is 10% or more.

In the present specification, the minimum transmittance in a wavelength range of 6 μm to 12 μm means the minimum value of the transmittance in a wavelength range of 6 μm to 12 μm.

The minimum transmittance in a wavelength range of 6 μm to 12 μm is preferably 30% or more and more preferably 50% or more.

The upper limit of the minimum transmittance in a wavelength range of 6 μm to 12 μm is not particularly limited, but in view of the manufacturing suitability of the laminate, the preferable upper limit is 99%, more preferable upper limit is 90%, and the even more preferable upper limit is 80%.

(Maximum Reflectance)

In view of the antireflection function, with respect to the laminate according to the form B, the maximum reflectance in a wavelength range of 6 μm to 12 μm is preferably 40% or less, more preferably 30% or less, and even more preferably 20% or less.

In the present specification, the maximum reflectance in a wavelength range of 6 μm to 12 μm means the maximum value of the reflectance in a wavelength range of 6 μm to 12 μm.

The maximum reflectance in a wavelength range of 6 μm to 12 μm may be 0% and may be more than 0%.

The reduction of the maximum reflectance in a wavelength range of 6 μm to 12 μm can be more easily achieved in a case where the laminate according to the form B includes the light interference layer.

The material of the light interference layer including the laminate according to the form B is preferably at least one metal compound selected from the group consisting of metal oxide, metal nitride, metal oxynitride, and metal fluoride, Si (single substance), or Ge (single substance). The metal element in the metal compound is preferably at least one element selected from the group consisting of Si, Al, Nb, Mg, Zr, La, Ti, Y, Ca, Ba, Li, and Na.

[Building Material]

The building material of the present disclosure includes the laminate of the present disclosure described above.

The building material of the present disclosure includes the laminate of the present disclosure with reduced thermal conductivity, and thus has an excellent thermal insulation function.

Examples of the building material include a wall material, a floor material, and a window material.

The building material of the present disclosure may be the laminate of the present disclosure described above, or may be a composite member of the laminate of the present disclosure described above and another member.

As the other members, any members well-known in the field of construction materials can be used without particular limitation.

[Window Material]

The window material of the present disclosure includes the laminate according to the form A or B.

The window material of the present disclosure includes the laminate of the present disclosure with reduced thermal conductivity, and thus has an excellent thermal insulation function. The window material of the present disclosure also has the optical function in the form A or B.

Examples of the window material include window materials for construction, window materials for vehicles, window materials for aircraft, window materials for ships, and window materials for radiation cooling devices.

The window material of the present disclosure may be the laminate of the present disclosure in the form A or B, or may be a composite member of the laminate of the present disclosure in the form A or B and another member.

As the other members, any members well-known in various technical fields such as construction, vehicles, aircraft, ships, and radiation cooling devices can be used without particular limitation.

The window material including the laminate according to the form A is suitable as window materials for construction, window materials for vehicles, window materials for aircraft, and window materials for ships.

The window material including the laminate according to the form A has a function to transmitting a visible light at a wavelength of 400 nm to 800 nm and an excellent thermal insulation function, required as a function of window materials for construction, window materials for vehicles, window materials for aircraft, window materials for ships, and the like.

The window material including the laminate according to the form B is also suitable for window materials for radiation cooling devices.

The window material including the laminate according to the form B has a function to transmit infrared light at a wavelength of 6 μm to 12 μm and an excellent thermal insulation function, required as a function of window materials for construction, window materials for vehicles, window materials for aircraft, window materials for ships, and the like.

Here, an example of the radiation cooling device is described.

The radiation cooling device according to the present example is a device for cooling an object to be cooled contained in the device by using a radiation cooling phenomenon. That is, the radiation cooling device according to the present example has an internal space that contains the object to be cooled. The window material for a radiation cooling device according to the present example constitutes a part of a partition for determining the internal space, and is disposed on the sky side with respect to the internal space.

The cooling (radiation cooling) of the object to be cooled by the above radiation cooling device is performed by emitting infrared light at a wavelength of 6 μm to 12 μm from the inner space toward the sky. Therefore, the window material for the radiation cooling device is required to have a function of transmitting infrared light at a wavelength of 6 μm to 12 μm as a first function. Furthermore, the window material for the radiation cooling device is also required to have a function (that is, a thermal insulation function) to suppress heat inflow from the outside of the device as a second function.

The window material including the laminate according to the form B is suitable as the window material for the radiation cooling device which has the first function and the second function.

[Radiation Cooling Device]

The radiation cooling device of the present disclosure includes the laminate of the form B.

The laminate according to the form B has a function of transmitting infrared light at a wavelength of 6 μm to 12 μm, and an excellent thermal insulation function.

Therefore, according to the radiation cooling device of the present disclosure including the laminate according to the form B, both of the radiation cooling effect and the heat inflow suppressing effect from the outside can be obtained, and thus the object to be cooled can be effectively cooled.

An example of the radiation cooling device is as described above.

More specifically, the radiation cooling device includes, for example, the radiation cooling device described in "Passive radiative cooling below ambient air temperature under direct sunlight" Nature, Vol. 515, 540, 2014 written by A. P. Raman et al.

EXAMPLES

Hereinafter, examples of the present disclosure are provided, but the present disclosure is not limited to the following examples.

Example 1

<Manufacturing of Laminate>

On a Si substrate as the substrate, by the vapor deposition with an electron cyclotron sputtering device, each 50 layers of $Al_2O_3$ layers as the first layers (layers X) and $SiO_2$ layers as the second layers (layers Y) were alternately (that is, in a disposition of the substrate/the layer X/the layer Y/the layer X/the layer Y, and the like. the same is applied below.) were formed, so as to form a laminated structure having 100 layers.

At this point, the layer thickness for each layer is caused to be uneven by changing the film formation time for each layer.

As described above, the laminate of Example 1 was obtained.

Here, the specific acoustic impedances of $Al_2O_3$ and $SiO_2$ were respectively $2.5 \times 10^7$ N·s/m³ and $1.3 \times 10^7$ N·s/m³, and the both were different from each other.

<Layer Thickness Measurement>

A cross section of the laminated structure in the laminate was formed by focused ion beam (FIB) processing, and a scanning transmission electron microscope (STEM) image of the obtained cross section at a magnification of 160,000 times with an acceleration voltage of 300 kV was obtained. As STEM, Titan 80-300 manufactured by FEI Company was used.

Based on the obtained STEM image, each layer thickness of the 100 layers was measured.

With the layer thicknesses of the obtained 100 layers as a population, the average layer thickness (that is, an arithmetic average value of the layer thickness), the largest layer thickness, and the CV value (=standard deviation of layer thickness/average layer thickness) were respectively obtained.

Results thereof are as presented in Table 1.

<Evaluation of Thermal Conductivity>

In order to obtain a thermoreflectance signal of the laminated structure of the laminate of Example 1, a 20 nm Al thin film was formed on the surface of the uppermost layer of the laminated structure by a radio frequency (RF) sputtering method. After the formation of the Al thin film, a thermoreflectance signal of the laminated structure of the laminate of Example 1 was acquired by a surface heating/surface detection type thermoreflectance method by using laser light with a period of 80 MHz.

In the same manner, the thermoreflectance signal of the film ($SiO_2$ single layer, layer thickness: 300 nm) of Comparative Example 1 described below was acquired.

The acquired thermoreflectance signals of Example 1 and Comparative Example 1 each were reproduced by heat conduction simulation according to a finite element method, so as to derive respective thermoreflectance signals. Here, the heat conduction simulation was performed for 2,000 ps to simulate the time from the start of heating at a period of 80 MHz to the steady state.

In the derived thermoreflectance signal, the thermal conductivity of the laminated structure of Example 1 was calculated based on the value 200 ps before the last heating pulse. The calculation condition of the thermal conductivity was a condition in which the thermal conductivity of the film of Comparative Example 1 and 1.38 W/(m·K) of the literature value of the thermal conductivity of $SiO_2$ coincide with each other.

The thermal conductivity (the calculation result by simulation) of Example 1 is presented in Table 1 as a relative value in a case where the thermal conductivity of the film ($SiO_2$ single layer, layer thickness: 300 nm) of Comparative Example 1 was set as 100.

Example 2

The same operation as in Example 1 was performed except that the substrate was changed to a synthetic quartz glass substrate (or less, also simply referred to as "quartz glass"). Results thereof are as presented in Table 1.

Example 3

Each 50 layers of $Nb_2O_5$ layers (layers X) and $SiO_2$ layers (layers Y) are alternately formed on a Si substrate as the substrate by vapor deposition using a radical assisted sputtering system so as to form laminated structure having 100 layers. At this point, the layer thickness for each layer is caused to be uneven by changing the film formation time for each layer.

Here, the specific acoustic impedances of $Nb_2O_5$ and $SiO_2$ were respectively $3.2 \times 10^7$ N·s/m³ and $1.3 \times 10^7$ N·s/m³, and the both were different from each other.

With respect to the obtained laminated structure, the measurement and the evaluation were performed in the same manner as in Example 1.

Results thereof are as presented in Table 1.

Comparative Example 1

One $SiO_2$ layer was formed on the Si substrate as the substrate by the vapor deposition with an electron cyclotron sputtering device.

With respect to the obtained $SiO_2$ layer, the measurement and the evaluation were performed in the same manner as in Example 1.

Results thereof are as presented in Table 1.

Comparative Example 2

On a Si substrate as the substrate, $Al_2O_3$ layers (layers X) and $SiO_2$ layers (layers Y) were alternately formed by vapor deposition using an electron cyclotron sputtering device, so as to form a laminated structure having seven layers (specifically, four $Al_2O_3$ layers and three $SiO_2$ layers). At this point, the layer thickness for each layer is caused to be uneven by changing the film formation time for each layer.

With respect to the obtained laminated structure, the measurement and the evaluation were performed in the same manner as in Example 1.

Results thereof are as presented in Table 1.

Comparative Example 3

On a quartz glass substrate as the substrate, each 50 layers of $Al_2O_3$ layers (layers X) and $SiO_2$ layers (layers Y) were alternately formed by vapor deposition using an electron cyclotron sputtering device, so as to form a laminated structure having 100 layers. At this point, all of the film formation times of the 50 layers of $Al_2O_3$ layers were set to be the same, and all of the film formation times of the 50 layers of $SiO_2$ layers were set to be the same, such that each layer thickness of all of the 100 layers was 3.0 nm.

With respect to the obtained laminated structure, the measurement and the evaluation were performed in the same manner as in Example 1.

Results thereof are as presented in Table 1.

Comparative Example 4

On a Si substrate as the substrate, $Al_2O_3$ layers (layers X) and $SiO_2$ layers (layers Y) were alternately formed by vapor deposition using an electron cyclotron sputtering device, so as to form a laminated structure having 25 layers (specifically, 13 $Al_2O_3$ layers and 12 $SiO_2$ layers). At this point, the layer thickness for each layer is caused to be uneven by changing the film formation time for each layer.

With respect to the obtained laminated structure, the measurement and the evaluation were performed in the same manner as in Example 1.

Results thereof are as presented in Table 1.

TABLE 1

| | | Laminated structure | | | | | | | |
|---|---|---|---|---|---|---|---|---|---|
| | | Layer X | | Layer Y | | | Average layer thickness (nm) | Largest layer thickness (nm) | CV value | Thermal conductivity (relative value) |
| | Material of substrate | Material | Number of layers | Material | Number of layers | Number of layers | | | | |
| Example 1 | Si | $Al_2O_3$ | 50 | $SiO_2$ | 50 | 100 | 2.9 | 3.5 | 0.13 | 54 |
| Example 2 | Quartz glass | $Al_2O_3$ | 50 | $SiO_2$ | 50 | 100 | 2.9 | 3.5 | 0.13 | 54 |
| Example 3 | Si | $Nb_2O_5$ | 50 | $SiO_2$ | 50 | 100 | 3.0 | 3.5 | 0.13 | 53 |
| Comparative Example 1 | Si | $SiO_2$ | 1 | None | | 1 | 300 | 300 | — | 100 |
| Comparative Example 2 | Si | $Al_2O_3$ | 4 | $SiO_2$ | 3 | 7 | 3.1 | 3.5 | 0.12 | 90 |
| Comparative Example 3 | Quartz glass | $Al_2O_3$ | 50 | $SiO_2$ | 50 | 100 | 3.0 | 3.0 | 0 | 83 |
| Comparative Example 4 | Si | $Al_2O_3$ | 13 | $SiO_2$ | 12 | 25 | 11.9 | 14.3 | 0.12 | 91 |

From Table 1, it is understood that, in the laminated structures of Comparative Examples 1 to 3, in which the number of layers constituting the laminated structure was 10 or more, the thickness of a layer having the largest thickness among the layers constituting the laminated structure was 8 nm or less, and the CV value of the laminated structure was 0.05 or more, the thermal conductivity than the film of Comparative Example 1 and the laminated structures of Comparative Examples 2 to 4.

Example 101

<Forming of Laminate>

Light interference layers 1 to 8 of the materials presented in Table 2 were formed on a quartz glass as the substrate in this order by using a radio frequency (RF) sputtering method. Subsequently, the laminated structure (100 layers) formed in Example 2 was formed on the light interference layer 8. The light interference layers 9 and 10 presented in Table 2 were formed on the formed laminated structure in this order.

As above, a laminate of Example 101 having the layer configuration presented in Table 2 was obtained.

The refractive index presented in Table 2 is a refractive index (the same is applied to Table 3 described below) in a measurement wavelength of 540 nm which is measured by using a spectroscopic ellipsometer MASS manufactured by Five Lab Co., Ltd.

The thickness presented in Table 2 is a value measured by the same method as in the layer thickness measurement in Example 1 (here, the measurement magnification was appropriately selected according to the thickness of the object to be measured) (the same is applied to Table 3 described below).

TABLE 2

| | Material | Refractive index | Thickness (nm) |
|---|---|---|---|
| Light interference layer 10 | SiO$_2$ | 1.47 | 109.45 |
| Light interference layer 9 | TiO$_2$ | 2.35 | 10.18 |
| Laminated structure | Laminated structure of Example 2 (100 layers in total) | 1.65 | 290 |
| Light interference layer 8 | SiO$_2$ | 1.47 | 57.88 |
| Light interference layer 7 | TiO$_2$ | 2.35 | 15.46 |
| Light interference layer 6 | SiO$_2$ | 1.47 | 44.8 |
| Light interference layer 5 | TiO$_2$ | 2.35 | 44.42 |
| Light interference layer 4 | SiO$_2$ | 1.47 | 20.95 |
| Light interference layer 3 | TiO$_2$ | 2.35 | 38.16 |
| Light interference layer 2 | SiO$_2$ | 1.47 | 45.28 |
| Light interference layer 1 | TiO$_2$ | 2.35 | 10.62 |
| Substrate | Quartz glass | 1.46 | — |

<Spectral Characteristics in Wavelength Range of 400 nm to 800 nm>

Spectral characteristics (reflection spectrum and transmission spectrum) of the laminate of Example 101 in a wavelength range of 400 nm to 800 nm was measured by using a spectrophotometer U-4000 manufactured by Hitachi, Ltd.

In the same manner, with respect to the laminate of Example 2, spectral characteristics (reflection spectrum and transmission spectrum) in the wavelength range of 400 nm to 800 nm were measured.

Figure 2:
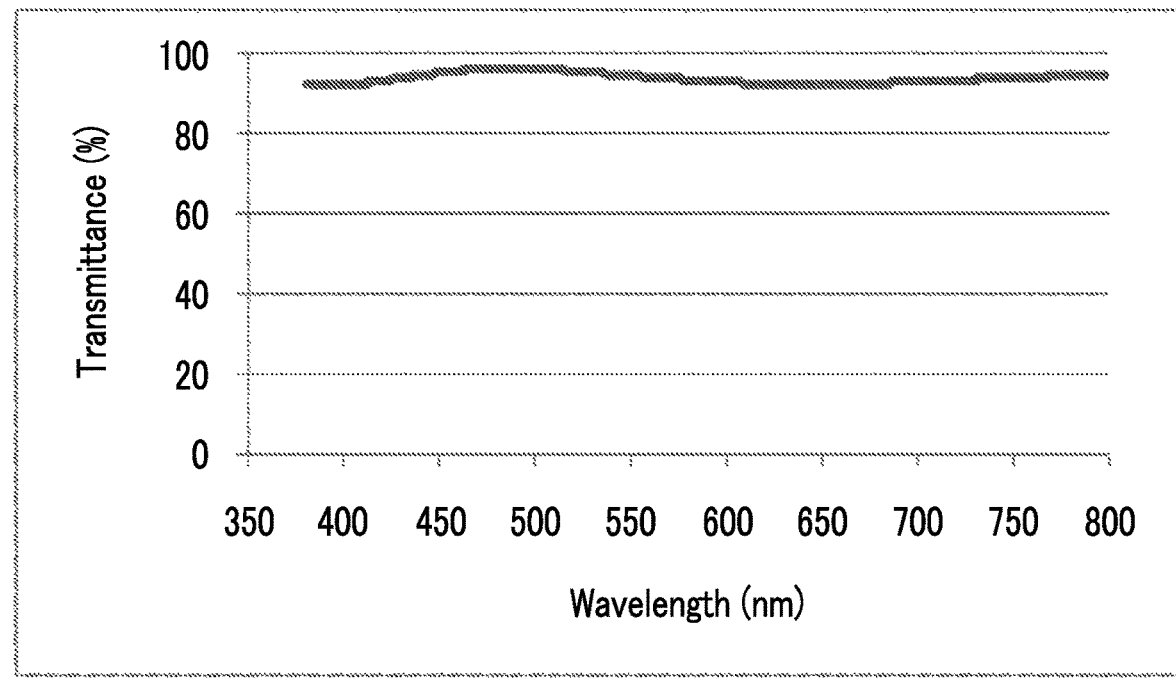
FIG. 2 is a transmission spectrum of the laminate of Example 2 in a wavelength range of 400 nm to 800 nm.
Figure 3:
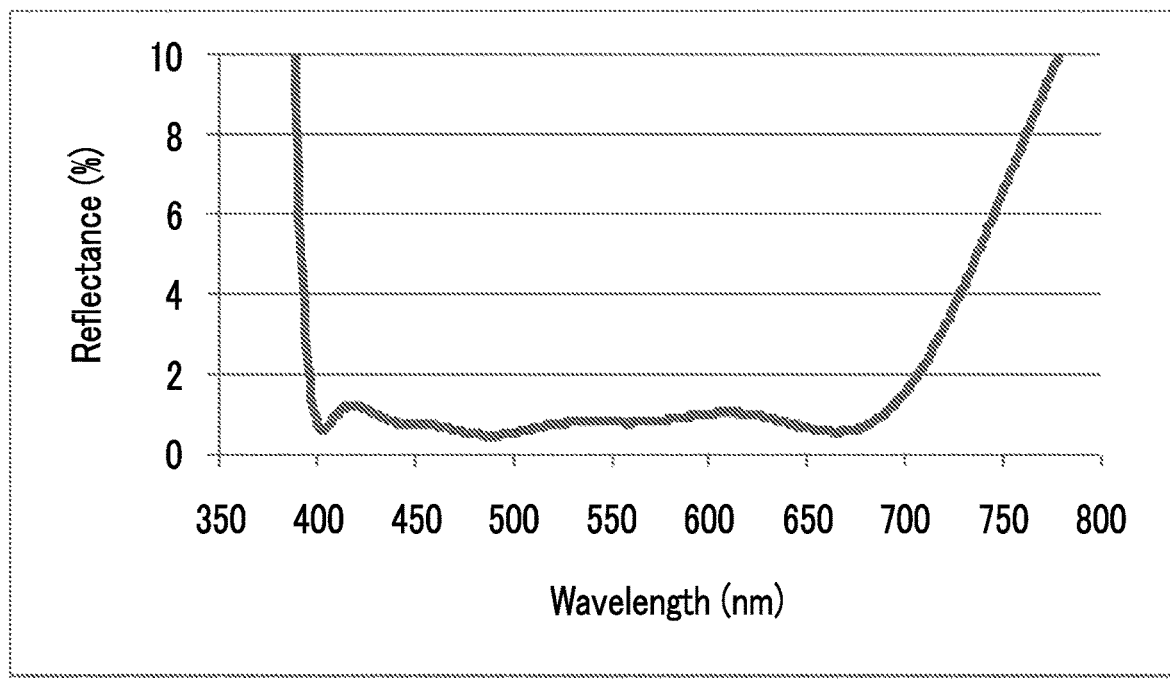
FIG. 3 is a reflection spectrum of a laminate of Example 101 in a wavelength range of 400 nm to 800 nm.
Figure 4:
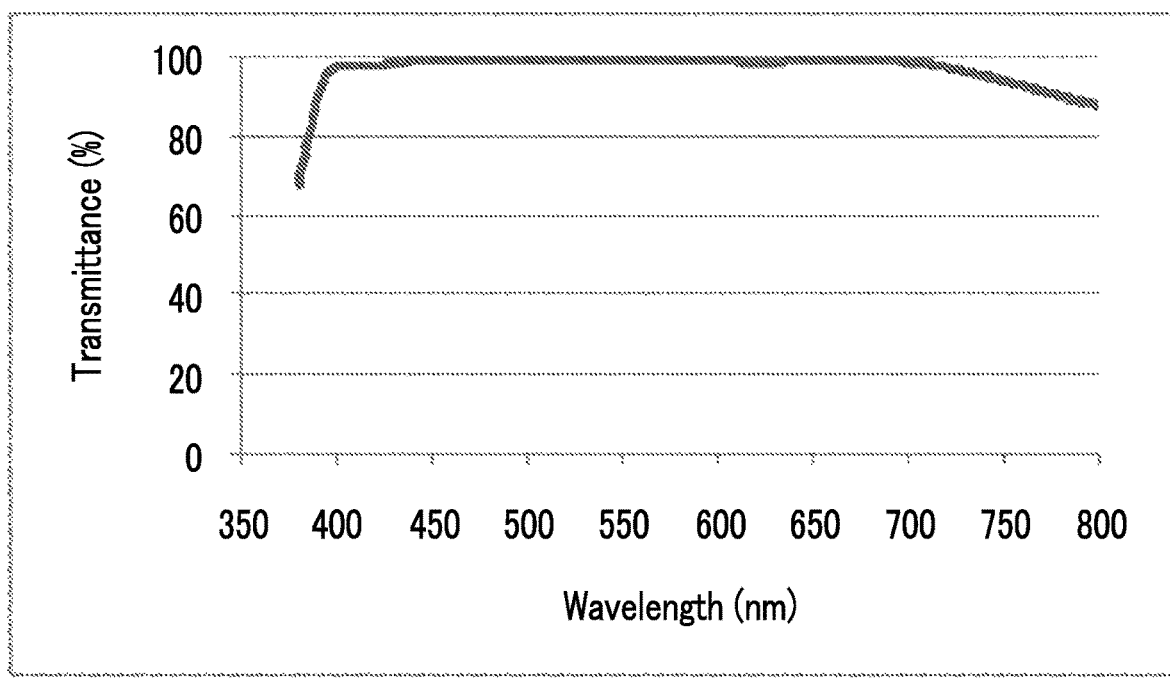
FIG. 4 is a transmission spectrum of the laminate of Example 101 in a wavelength range of 400 nm to 800 nm.

FIG. 1 is a reflection spectrum of the laminate of Example 2 in a wavelength range of 400 nm to 800 nm, FIG. 2 is a transmission spectrum of the laminate of Example 2 in a wavelength range of 400 nm to 800 nm, FIG. 3 is a reflection spectrum of the laminate of Example 101 in a wavelength range of 400 nm to 800 nm, and FIG. 4 is a transmission spectrum of the laminate of Example 101 in a wavelength range of 400 nm to 800 nm.

From FIGS. 2 and 4, it is understood that in all of the laminates of Examples 2 and 101, the transmittance in the wavelength range of 400 nm to 800 nm is more than 60%. Accordingly, it is understood that all laminates can be used as window materials (for example, window materials for construction, window materials for vehicles, window materials for aircraft, and window materials for ships).

From the comparison between FIGS. 1 and 3, it is understood that, in the laminate of Example 101 including the light interference layers 1 to 10, the reflectance in the wavelength region of 400 nm to 750 nm was able to be selectively reduced, compared with the laminate of Example 2 not including the light interference layers 1 to 10.

Example 201

<Forming of Laminate>

A ZnS layer as the light interference layer was formed on a Ge substrate as the substrate by electron beam evaporation. On the light interference layer, each 50 layers of SiN layers and AlN layers were alternately formed by vapor deposition using an electron cyclotron sputtering device, so as to form a laminated structure (the number of layers was 100). At this point, the layer thickness for each layer is caused to be uneven by changing the film formation time for each layer. The layer that was in contact with the light interference layer was a SiN layer. As described above, the laminate of Example 201 was obtained.

Here, the specific acoustic impedances of SiN and AlN were respectively $3.6 \times 10^7$ N·s/m$^3$ and $3.3 \times 10^7$ N·s/m$^3$, and the both were different from each other.

<Measurement of Layer Thickness, Evaluation of Thermal Conductivity>

The measurement and the evaluation were performed in the same manner as in Example 1 by using the laminate of Example 201.

As a result, the average layer thickness of the layer constituting the laminated structure was 3.1 nm, and the largest layer thickness was 3.5 nm, and the CV value was 0.13.

The thermal conductivity of Example 201 in a case where the thermal conductivity of Comparative Example 1 was set to 100 was 70.

The layer configuration of the laminate of Examples 201 is presented in Table 3.

TABLE 3

| | Material | Refractive index | Thickness (nm) |
|---|---|---|---|
| Laminated structure | Laminated structure of SiN layers/AlN layers (100 layers in total) | 1.86 | 310 |
| Light interference layer | ZnS | 2.22 | 711.34 |
| Substrate | Ge | 4.00 | — |

<Spectral Characteristics in Wavelength Range of 4 μm to 15 μm>

Spectral characteristics (reflection spectrum and transmission spectrum) of the laminate of Example 201 in a wavelength range of 4 μm to 15 μm were measured by using FTIR VIR-200 manufactured by JASCO Corporation.

Figure 5:
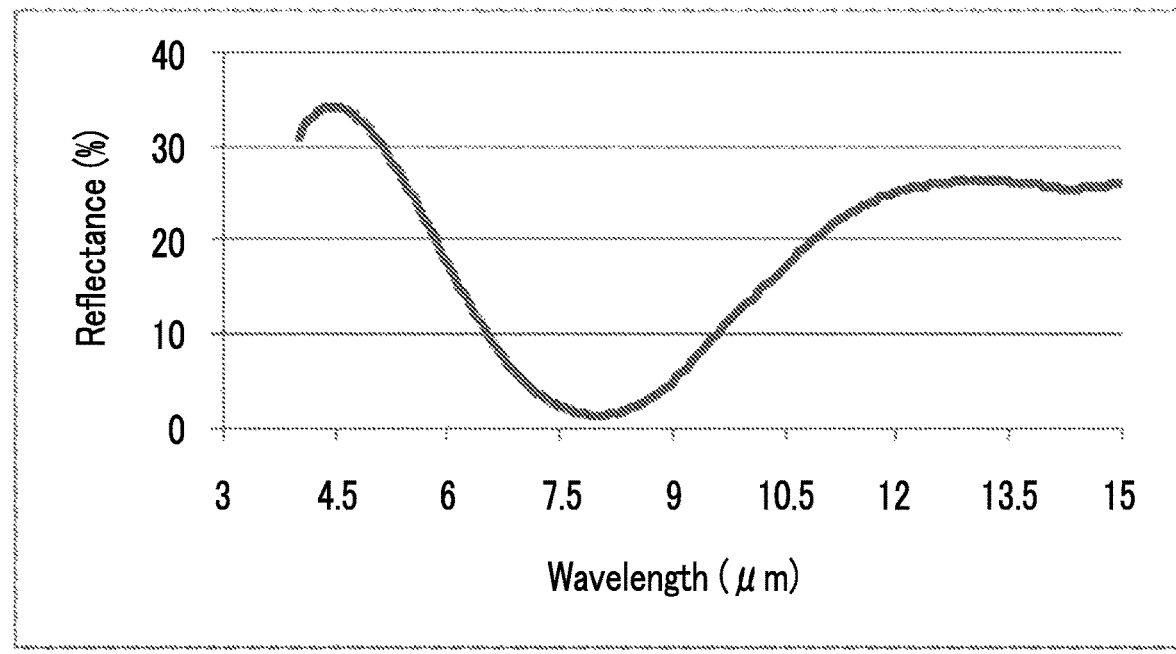
FIG. 5 is a reflection spectrum of a laminate of Example 201 in a wavelength range of 4 µm to 15 µm.
Figure 6:
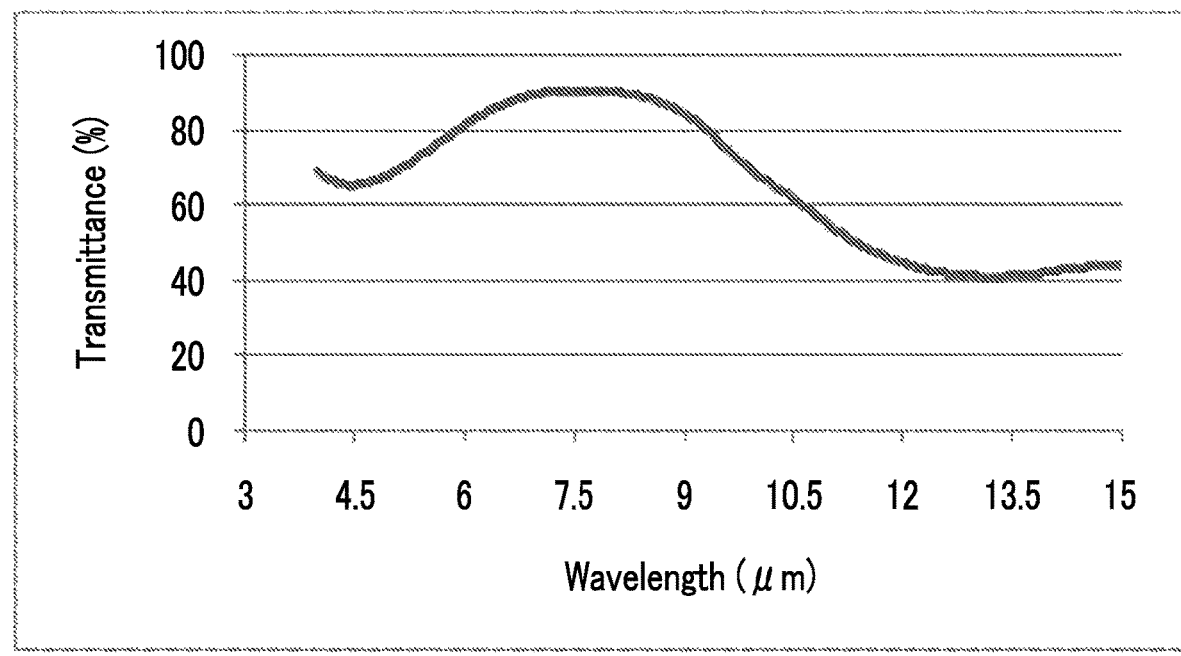
FIG. 6 is a transmission spectrum of the laminate of Example 201 in a wavelength range of 4 µm to 15 µm.

FIG. 5 is a reflection spectrum of the laminate of Example 201 in a wavelength range of 4 μm to 15 μm, and FIG. 6 is a transmission spectrum of the laminate of Example 201 in a wavelength range of 4 μm to 15 μm.

From FIG. 6, it is understood that, in the laminate of Example 201, the transmittance in the wavelength range of 6 μm to 12 μm was more than 40%. From this result, it is understood that the laminate of Example 201 was able to be used as a window material for a radiation cooling device.

From FIG. 5, it is understood that, in the laminate of Example 201, the reflectance in the wavelength region of 7 μm to 10 μm was able to be selectively reduced. From this result, it is understood that the laminate of Example 201 was able to transmit infrared rays in this wavelength range while suppressing the reflectance in the wavelength range of 7 μm to 10 μm. Therefore, it is understood that an effective radiation cooling effect was able to be obtained in a case of being used as a window material for a radiation cooling device.

The disclosure of JP2017-069169 filed on Mar. 30, 2017 is incorporated herein by reference in its entirety.

All documents, patent applications, and technical standards described in the present specification are incorporated into the present specification to the same extent in a case where each individual document, patent application, and technical standard was specifically and individually indicated to be incorporated by reference.

What is claimed is:

1. A laminate comprising:
a substrate; and
a laminated structure that comprises two or more kinds of layers having different specific acoustic impedances and that is disposed on the substrate,
a number of layers constituting the laminated structure being 10 or more,
a thickness of a layer having the largest thickness among the layers constituting the laminated structure being 8 nm or less, and
the laminated structure having a CV value, that is defined by a standard deviation of layer thicknesses/average layer thickness, of 0.05 or more.

2. The laminate according to claim 1, wherein the number of the layers constituting the laminated structure is 100 or more.

3. The laminate according to claim 1, wherein the laminated structure is consisted of two or more kinds of metal compounds selected from the group consisting of a metal oxide, a metal nitride, a metal oxynitride, and a metal sulfide.

4. The laminate according to claim 3, wherein a metal element in the two or more kinds of metal compounds comprises at least one element selected from the group consisting of Si, Al, Nb, Mg, Zr, Ge, and Zn.

5. The laminate according to claim 1, wherein the two or more kinds of layers having different specific acoustic impedances comprise two or more kinds of metal oxide layers or two or more kinds of metal nitride layers.

6. The laminate according to claim 1, wherein the two or more kinds of layers having different specific acoustic impedances comprise a combination of an $Al_2O_3$ layer and a $SiO_2$ layer, a combination of a $Nb_2O_5$ layer and a $SiO_2$ layer, and a combination of an AlN layer and an SiN layer.

7. The laminate according to claim 1, further comprising a light interference layer having a layer thickness of greater than 8 nm.

8. The laminate according to claim 1, wherein the minimum transmittance in a wavelength range of 400 nm to 800 nm is 10% or more.

9. The laminate according to claim 1, wherein the minimum transmittance in a wavelength range of 6 μm to 12 μm is 10% or more.

10. A building material comprising the laminate according to claim 1.

11. A window material comprising the laminate according to claim 8.

12. A radiation cooling device comprising the laminate according to claim 9.

13. A window material comprising the laminate according to claim 9.

* * * * *